United States Patent
Meier (10) Patent No.: US 12,376,508 B2
(45) Date of Patent: Aug. 5, 2025

(54) SHEATH FOR A SOIL WORKING ROLLER

(71) Applicant: Hamm AG, Tirschenreuth (DE)

(72) Inventor: Matthias Meier, Tirschenreuth (DE)

(73) Assignee: Hamm AG, Tirschenreuth (DE)

( * ) Notice: Subject to any disclaimer, the term of this patent is extended or adjusted under 35 U.S.C. 154(b) by 694 days.

(21) Appl. No.: 17/383,721

(22) Filed: Jul. 23, 2021

(65) Prior Publication Data

US 2022/0030755 A1 Feb. 3, 2022

(30) Foreign Application Priority Data

Aug. 3, 2020 (DE) ...................... 10 2020 120 377.2

(51) Int. Cl.
*A01B 33/02* (2006.01)
*A01B 29/00* (2006.01)
(Continued)

(52) U.S. Cl.
CPC .......... *A01B 33/021* (2013.01); *A01B 29/045* (2013.01); *A01B 33/12* (2013.01); *A01B 33/144* (2013.01); *A01B 29/00* (2013.01)

(58) Field of Classification Search
CPC ..... A01B 33/12; A01B 33/021; A01B 33/144; A01B 29/00; A01B 29/04; A01B 29/045;
(Continued)

(56) References Cited

U.S. PATENT DOCUMENTS 5,511,901 A * 4/1996 Yates ................... E01C 19/236
404/124
6,685,273 B1 * 2/2004 Sollami ................. B28D 1/188
299/110
(Continued)

FOREIGN PATENT DOCUMENTS

CN 101278093 10/2008
CN 102518023 A 6/2012
(Continued)

OTHER PUBLICATIONS https://www.youtube.com/watch?v=WWC7TVAvQy8 (Year: 2020).*
(Continued)

*Primary Examiner* — Matthew Troutman
*Assistant Examiner* — Audrey L Lusk
(74) *Attorney, Agent, or Firm* — Rankin, Hill & Clark LLP (57) ABSTRACT

A sheath for a soil working roller includes a plurality of sheath segments mounted or mountable to surround a roller body of the soil working roller and following one another in the circumferential direction. A plurality of roller tools is arranged on an outer side of the sheath segments and at least one part of the roller tools includes an interchangeable holder mounted on a respective sheath segment and a replaceable tool detachably mounted or mountable on the interchangeable holder. A fastening opening is formed in the interchangeable holder for accommodating a fastening shaft of a replaceable tool mounted or to be mounted on the interchangeable holder. An impacted tool through opening is provided in association with the at least one interchangeable holder in the sheath segment supporting the same for engaging the fastening shaft of the replaceable tool mounted on the interchangeable holder with an impacted tool.

12 Claims, 4 Drawing Sheets

(51) Int. Cl.
*A01B 29/04* (2006.01)
*A01B 33/12* (2006.01)
*A01B 33/14* (2006.01)

(58) Field of Classification Search
CPC ...... E02F 9/2866; E02F 9/2825; E01C 19/41; E01C 19/43
USPC .......................... 172/557, 603, 604; 404/124
See application file for complete search history.

(56) References Cited

U.S. PATENT DOCUMENTS

| | | | |
|---|---|---|---|
| 2002/0010994 A1* | 1/2002 | Hess | E02F 9/2891 29/275 |
| 2002/0114667 A1* | 8/2002 | Kaldenberg | E02D 3/026 404/124 |
| 2008/0229627 A1 | 9/2008 | Calderwood | |
| 2011/0251036 A1* | 10/2011 | Doetsch | E01C 19/236 492/48 |
| 2014/0369752 A1* | 12/2014 | Meier | E02D 3/026 404/121 |
| 2015/0063908 A1* | 3/2015 | Meier | E02D 3/039 404/122 |
| 2020/0190750 A1* | 6/2020 | Meier | E01C 19/266 |

FOREIGN PATENT DOCUMENTS

| | | |
|---|---|---|
| CN | 103205958 | 7/2013 |
| DE | 2442348 | 3/1976 |
| DE | 8516248 | 8/1985 |
| DE | 112011103359 | 7/2013 |
| DE | 102013217043 | 3/2015 |

OTHER PUBLICATIONS

German Search Report for German application No. 10 2020 120 377.2 dated Apr. 29, 2021, 14 pages.
Chinese Office Action of CN202110895113.2 dated Apr. 25, 2023, 7 pages.
Chinese Office Action and Search Report of CN Serial No. 202110895113.2, 8 pages.

* cited by examiner

SHEATH FOR A SOIL WORKING ROLLER

BACKGROUND

The present invention relates to a sheath for a soil working roller on which at least one roller tool is provided with an interchangeable holder and a replaceable tool detachably mounted or mountable on the interchangeable holder.

A soil working roller for a soil processing machine is known from WO 2013/017545 A2, which comprises a roller body with a roller shell rotating about a roller axis of rotation in a soil processing operation. A plurality of roller tools is mounted on an outer circumferential surface of the roller shell. The roller tools each comprise an interchangeable holder, fastened on the outer circumferential surface of the roller shell by welding, with a fastening opening formed therein extending substantially radially with respect to the roller axis of rotation. The replaceable tools to be mounted on an interchangeable holder of this type comprise a fastening shaft to be shoved into the fastening opening. In the case of a fastening shaft accommodated in a fastening opening, a replaceable tool is fixed on the same by clamping action or latching action.

In the case of a design of a roller tool, known from EP 2 843 135 A1, having an interchangeable holder and a replaceable tool, the fastening shaft of the replaceable tool, guided into a fastening opening of the interchangeable holder, is secured by holding elements on the interchangeable holder which are inserted into lateral openings of the interchangeable holder and surrounding the fastening shaft.

To detach a replaceable tool thus fixed on the interchangeable holder, a tool, designed, for example, like a type of crowbar, is inserted laterally through an opening formed in the interchangeable holder into an interchangeable holder interior space surrounded by the interchangeable holder until it contacts an area of impingement behind the fastening shaft of the replaceable tool accommodated in the fastening opening of the interchangeable holder. The fastening shaft is impinged by a lever movement or a wedge effect of the tool supported on the roller shell and is moved in the direction out of the fastening opening accommodating the same.

It is the object of the present invention to provide a sheath for a soil working roller in which a replaceable tool of a roller tool accommodated in an interchangeable holder may be easily detached from the interchangeable holder.

SUMMARY

According to the invention, this problem is solved by a sheath for a soil working roller of a soil processing machine which is rotatable about a roller axis of rotation and comprises a plurality of sheath segments, mounted or mountable to surround a roller body of the soil working roller and following one another in the circumferential direction, wherein a plurality of roller tools is arranged on an outer side of the sheath segments to be positioned facing away from the roller body, wherein at least one part, preferably all, of the roller tools comprise an interchangeable holder mounted on a respective sheath segment and a replaceable tool detachably mounted or mountable on the interchangeable holder of the same, wherein a fastening opening is formed in the interchangeable holder for accommodating a fastening shaft of a replaceable tool mounted or to be mounted on the interchangeable holder, wherein a tool through opening is provided in association with the at least one, preferably each interchangeable holder in the sheath segment supporting the same.

By providing a tool through opening of this type, it is possible to act on the fastening shaft of the replaceable tool supported on the interchangeable holder by means of a tool guided through said tool through opening, and by this means to detach said replaceable tool from the interchangeable holder. The lateral engagement into the interchangeable holder by means of a lever-like or wedge-acting tool is thus not necessary. Since these types of roller tools according to the invention with an interchangeable holder and replaceable tool are themselves mounted on a sheath for a soil working roller and not directly on the roller shell of the soil working roller, the roller tools to be replaced may then be detached from the interchangeable holders accommodating the same when the sheath is removed from the roller body. This facilitates on the one hand a significantly simpler implementation of the process for removing the replaceable tools from the interchangeable holders accommodating the same, and on the other hand offers the possibility of operating a soil processing machine, either without the sheath of the soil working roller or with another sheath on the soil working roller, during this handling of the sheath.

In order to obtain a direct access to a fastening shaft allowing the detachment, it is proposed that the tool through opening, provided in association with the at least one interchangeable holder, is arranged substantially coaxially to the fastening opening formed in the same.

An interchangeable holder interior space may be formed in the at least one interchangeable holder, wherein the fastening opening provided in this interchangeable holder is open to the interchangeable holder interior space and the tool through opening provided in association with this interchangeable holder is open to the interchangeable holder interior space. This interchangeable holder interior space may thereby be provided, for example, by a preferably substantially cylindrical volume continuing the fastening opening. Alternatively, this type of interchangeable holder interior space may be laterally expanded with respect to the fastening opening, by which means structural material and thus also weight may be saved for an interchangeable holder of this type.

When, in the case of a replaceable tool mounted on the at least one interchangeable holder, the fastening shaft of this replaceable tool extends into the interchangeable holder interior space and is positioned with a tool engaging end opposite the tool through opening or engaging into the tool through opening, then the tool engaging end is positioned so that it may be acted on directly by means of a suitable tool.

Since a lateral engagement into the interchangeable holder to detach the replaceable tool is not necessary in the embodiment according to the invention, a particularly advantageous embodiment provides that the interchangeable holder interior space is substantially open only via the tool through opening, which is open to the same, when a replaceable tool is mounted on the at least one interchangeable holder. Lateral engagement openings in the interchangeable holder may thus be omitted, so that the interchangeable holder covers the tool through opening, in particular when a replaceable tool is supported in the interchangeable holder, the tool through opening is completely closed against the entry of contaminants.

Alternatively or additionally, it may be provided that when a replaceable tool is mounted on the at least one interchangeable holder, the tool through opening is substantially closed by the fastening shaft of this replaceable tool. In this way as well, the entry of contaminants into a respective tool through opening is prevented.

The invention further relates to a method for changing a replaceable tool, mounted on the at least one interchangeable holder on a sheath constructed according to the invention, in which method, in the case of a sheath segment at least partially detached from the roller body, the fastening shaft, accommodated in the fastening opening of the at least one interchangeable holder, is impacted through the tool through opening to move the fastening shaft out of the fastening opening of the at least one interchangeable holder.

In order to move the fastening shaft, generally held in a fastening opening with great force, out of the fastening opening, it is proposed that the fastening shaft is moved out of the fastening opening through hitting and/or pressing impacts.

The fastening shaft may be impacted, for example, by means of an impacted tool acting on the same through the tool through opening. An impacted tool of this type may be designed, for example, like a pin.

It may additionally be provided that the fastening shaft is impacted by hitting impacts of the impacted tool by means of an impacting tool. This type of impacting tool may be, for example, a hammer.

The invention further relates to a soil working roller for a soil processing machine comprising a roller body and a sheath designed according to the invention surrounding the roller body.

The invention further relates to a soil processing machine comprising at least one soil working roller constructed according to the invention.

BRIEF DESCRIPTION OF THE DRAWINGS

The present invention is subsequently described in detail with reference to the appended figures. As shown in.

DETAILED DESCRIPTION

Figure 1:
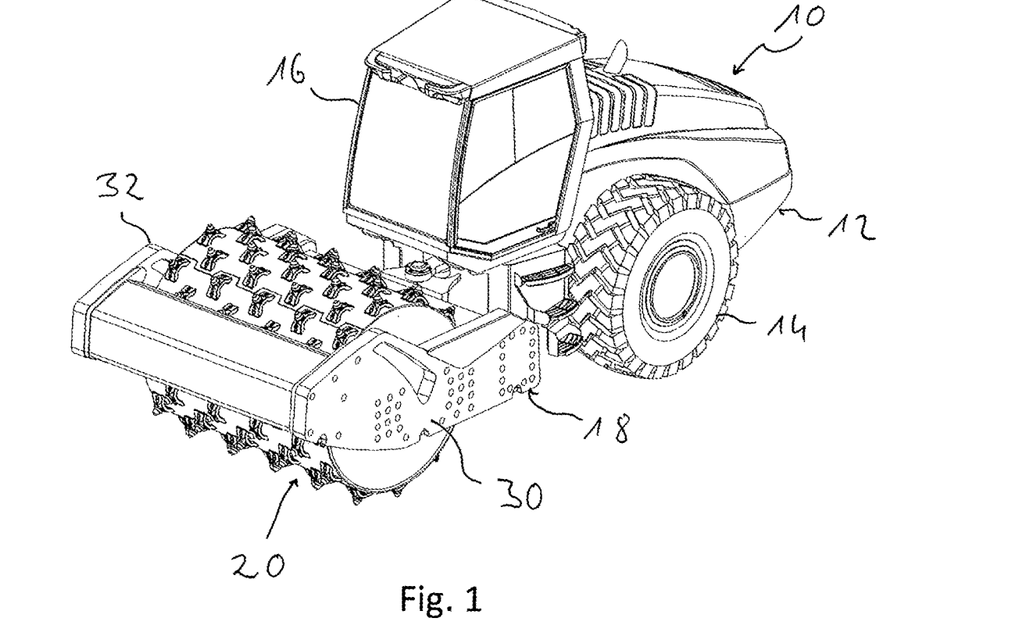
FIG. 1 a perspective view of a soil processing machine with a soil working roller.

In FIG. 1, a soil processing machine is generally designated with 10. Soil processing machine 10 comprises a rear section 12 with a drive assembly provided thereon and wheels 14 driven by the drive assembly, for example, a diesel internal combustion engine. Furthermore, a cabin 16 for an operator operating soil processing machine 10 is provided on rear segment 12.

Figure 2:
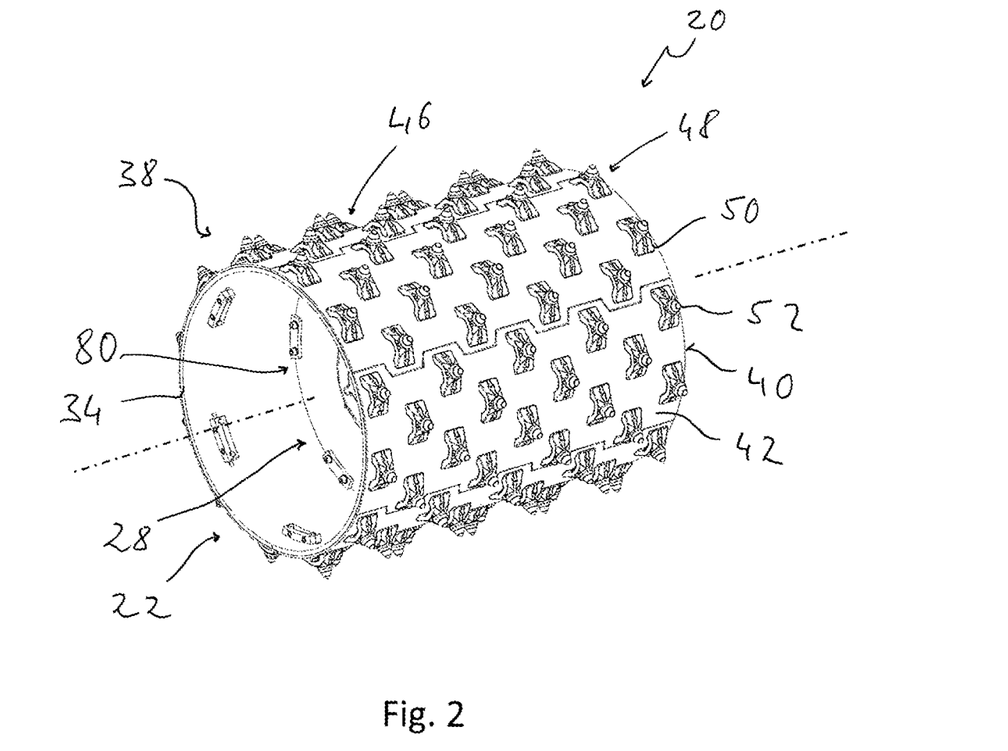
FIG. 2 the soil working roller of the soil processing machine from FIG. 1 in a perspective view.
Figure 3:
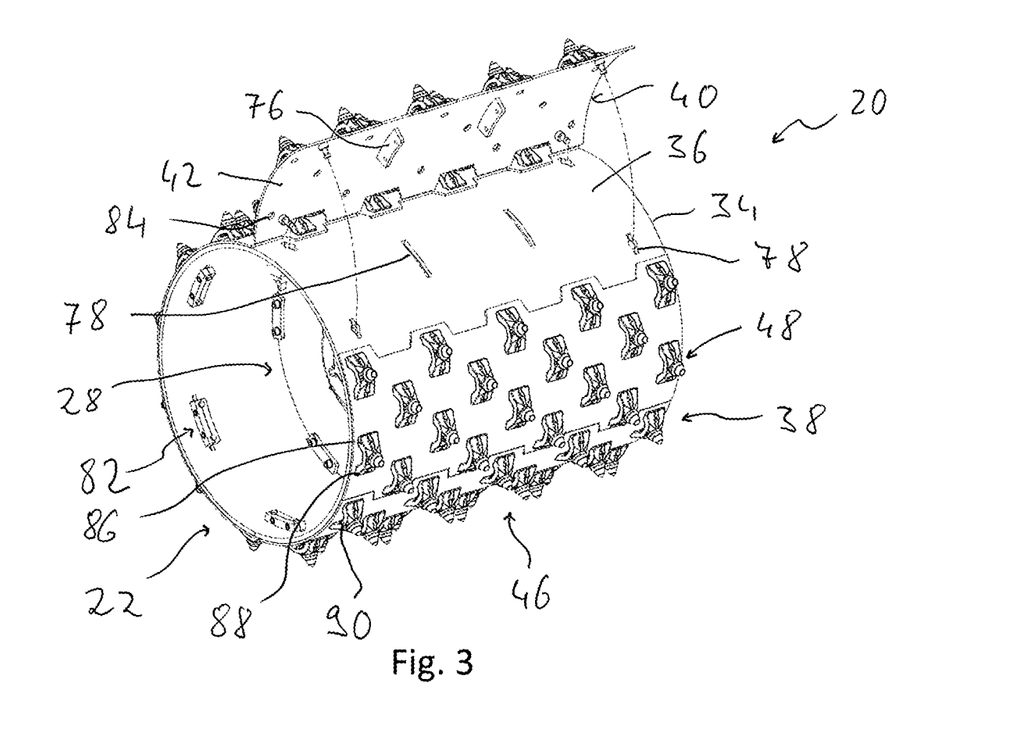
FIG. 3 the soil working roller from FIG. 2 with a sheath segment, detached from a roller body of the soil working roller, of a working shell provided on the roller body.

A soil working roller, generally designated with 20, rotatable about a roller axis of rotation W, is supported on a front section 18 pivotably connected to rear section 12. Soil working roller 20, depicted in more detail in FIG. 2, is constructed with a roller body 22 rotatably mounted on front section 18. Roller body 22 comprises a support structure 28, constructed in the depicted embodiment using two support disks generally designated as circular blanks and is mounted via respective mounting areas on lateral frame areas 30, 32 of front segment 18 to be rotatable about roller axis of rotation W. The two support disks are fixed, for example by welding, in their outer peripheral area to a substantially cylindrical and annularly-closed roller shell 34.

A sheath, generally designated with 38, is provided on a roller shell outer side 36. In the depicted embodiment, sheath 38 comprises six sheath segments 40, following one another in the circumferential direction and connecting directly to one another, which have curved segment shells 42 adapted to the circularly curved outer circumferential contour of roller shell 34. It is clear in FIG. 2 that segment shells 42 mutually engage in a tooth-like manner in their segment shell longitudinal edges 44 which adjoin one another in the circumferential direction.

Compacting roller 20 in this depicted embodiment is constructed as a so-called ground breaking roller, and has for this purpose a plurality of roller tools 48 on a working outer side 46 of sheath 38 on each of sheath segments 40. In the depicted example, these roller tools 48 are designed with an interchangeable holder 50 fixed, for example by welding, to a respective sheath segment 40 and a replaceable tool 52, in the shape of a chisel, accommodated in the interchangeable holder.

Each sheath segment 40, preferably designed identically to one another and constructed substantially mirror-symmetrically with respect to a longitudinal center, has four connecting regions 54, 56, 58, 60 axially spaced apart from one another in the direction of roller axis of rotation W. Sheath segments 40 may be fixed in each of these four connecting regions 54, 56, 58, 60 to roller shell 34 of roller body 22 so that a stable connection to roller body 22 is guaranteed across the entire axial length of sheath segments 40. Connecting regions 54, 60, located in axial end areas 62, 64 of sheath segments 40, therefore each form an end connecting region 66 or 68, while connecting regions 56, 58, positioned closer to the longitudinal center area of sheath segments 40, respectively form a center connecting region 70, 72.

One or more fastening means 76 is/are provided in each of connecting regions 54, 56, 58, 60 on a shell segment inner side 74 of segment shells 42 facing roller shell outer side 36. Fastening means 76, provided in center connecting regions 70, 72, are thereby designed as plate like and are fixed to segment shells 42, for example by welding, in such a way that they extend substantially in the circumferential direction.

In association with these plate-like fastening means 76, arranged in center connecting regions 70, 72 and extending substantially in the circumferential direction, fastening means through openings 78, which are slot-like and elongated substantially in the circumferential direction, are provided in roller shell 34. These are arranged axially directly adjacent to a respective support disk of support structure 28.

A fastening region 80 is formed on roller body 22 in association with each of these slot-like fastening means through openings 78 or in association with each fastening means 76 of center connecting regions 70, 72 to be positioned by engaging through this type of fastening means through opening 78. In the depicted embodiment, these fastening regions 80 are designed on the radially outer area of a respective support disk of support structure 28 and each comprises two openings provided, for example, with inner threads.

When mounting a respective sheath segment 40 on roller body 22, plate-like shaped fastening means 76 of center connecting regions 72, 74 are guided through fastening means through openings 78 provided axially immediately next to the support disks, so that they project radially inward on a roller shell inner side. Bolts may be guided through openings provided in these fastening means 76 and screwed into the openings of respectively assigned fastening region 80 in support structure 28.

Fastening means 76 provided in end connecting regions 66, 68 are configured as bolt-like and extend substantially radially inward to sheath segment inner side 74. These bolt-like fastening means 76 are constructed with a bolt foot, which is expanded with respect to a bolt shaft and may be fixed to a respective segment shell 42 by welding, so that bolt-like fastening means 76 of end connecting regions 66, 68 are also arranged fixedly on segment shells 42. It should thereby be clear that no opening is formed in the area of one of fastening means 76 in segment shells 42 respectively supporting the same, for example, in order to be able to guide a respective fastening means through a segment shell. This has the result that, in particular in those areas, in which fastening means 76 are arranged on segment shells 42, for example, on the outwardly exposed outer side of the segment shells, no openings are formed that are subjected to wear or that impair results.

In association with bolt-like fastening means 76 provided in end connecting regions 66, 68, bolt means through openings 78, which are likewise slot-like and elongated substantially in the circumferential direction, are provided in roller shell 34. These fastening means through openings 78, arranged in the axial end areas of roller shell 34, have an expansion in a longitudinal area lying in their longitudinal center. The bolt feet of bolt-like fastening means 76, positioned to engage in these fastening means through openings 78, may be accommodated in these expansions.

In the case of sheath segments 40 radially outwardly contacting roller shell 34, bolt-like fastening means 76, provided in end connecting regions 66, 68, project radially inward past roller shell 34. Bolt-like fastening means 76, respectively assigned to two different sheath segments 40, are located next to one another in pairs in the circumferential direction and are encompassed by a respective jaw assembly 82 and thus fixedly held with respect to support shell 34.

Tool through openings 84 are formed in segment shells 42 in the area of roller tools 48 in order to have access to replaceable tools 52 and to be able to detach the same from interchangeable holders 50. These tool through openings 84 are covered on the outside by interchangeable holders 50 so that the risk of penetration of material through these tool through openings 84 or the risk of wear in the area of these tool through openings 84 does not exist.

Figure 4:
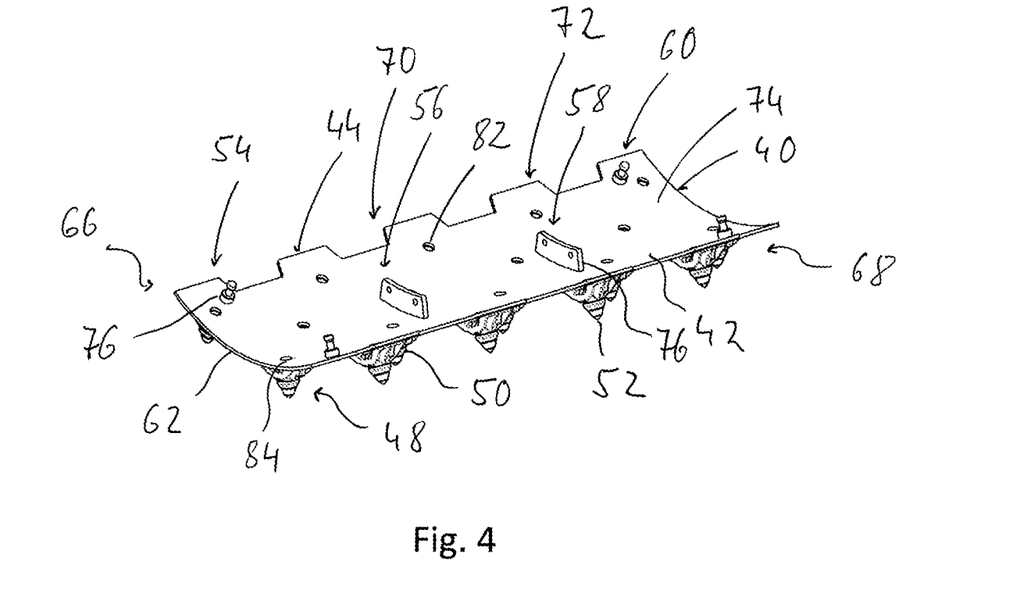
FIG. 4 a sheath segment viewed on the inner side.

FIG. 4 shows that a tool through opening 84 of this type is provided in association with each interchangeable holder 50 supported on a segment shell 42, so that in the case of sheath segments 40 of the type subsequently described with reference to FIGS. 5 and 6, which are detached from roller body 22, replaceable tools 52 supported in interchangeable holders 50 may be removed, for example, when they are worn or are to be exchanged for replaceable tools of another type. As this process of replacing or exchanging replaceable tools 50 may be carried out in a state, in which sheath segments 40 of sheath 38 are removed from roller body 22, the process for detaching replaceable tools 52 is easily carried out on the one hand, on the other hand, a soil processing machine may continue to be used while carrying out this operation, for example, in that another sheath 38 is mounted on roller body 22.

Figure 5:
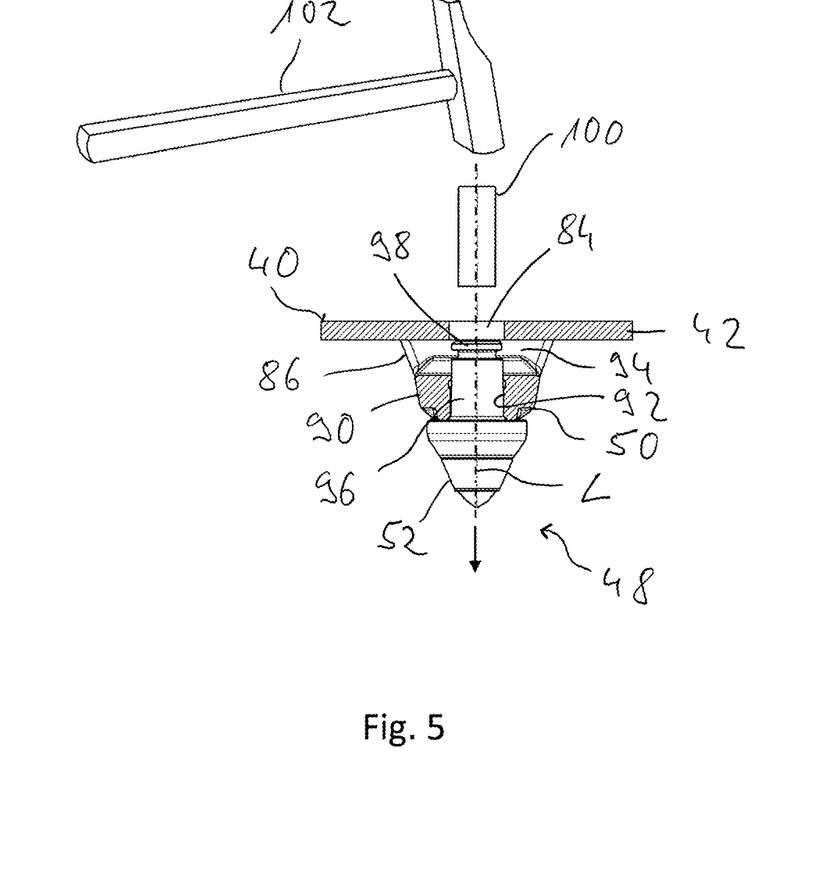
FIG. 5 the detaching of a replaceable tool of a roller tool of the soil working roller from FIG. 2 held in an interchangeable holder.
Figure 6:
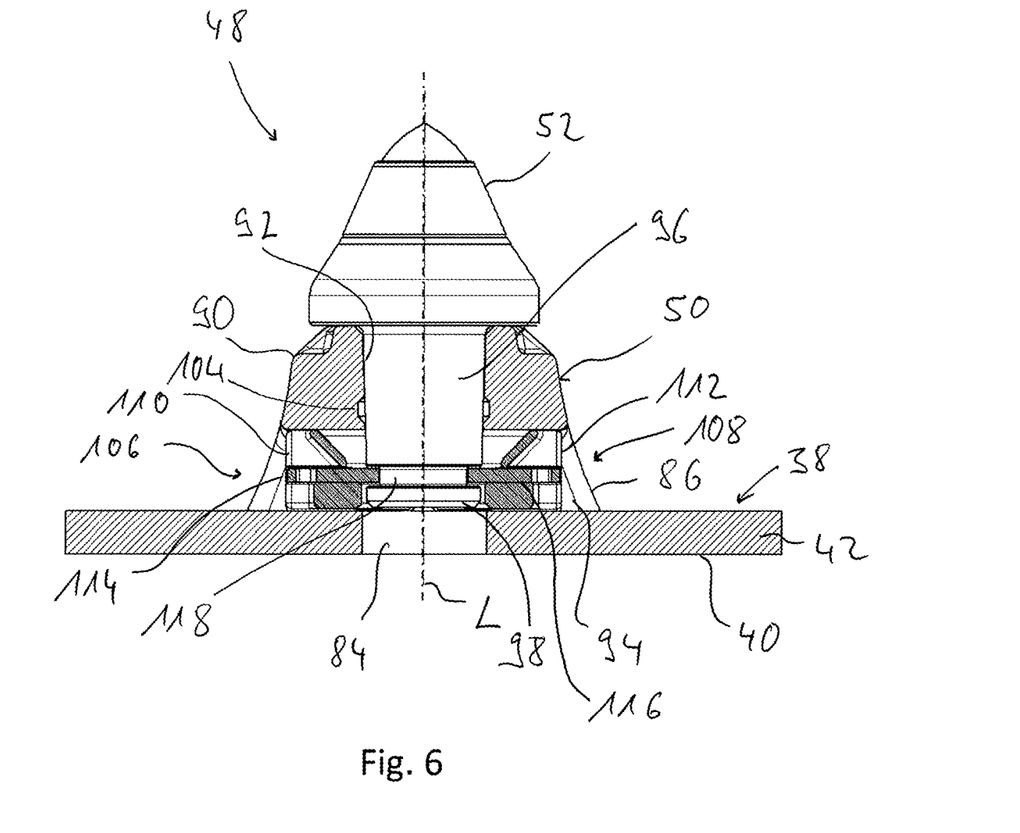
FIG. 6 a roller tool with interchangeable holder and replaceable tool arranged on a sheath segment of a sheath for a soil working roller.

FIGS. 5 and 6 show an interchangeable holder 50 mounted on the outer periphery of a segment shell 42 of a roller shell segment 40. This may be constructed, for example, as is disclosed in WO 2013/017545 A2 or EP 2 843 135 A1. Interchangeable holder 50 may have two foot regions 86, 88, which are arranged following one another in the circumferential direction, connected to the outer side of segment shell 42 by welding, and support or are integrally formed with a body portion 90 with a fastening opening 92 formed therein. An interchangeable holder interior space 94, delimited radially inwardly by segment shell 42, is formed between foot regions 86, 88 and body portion 90. A bolt-like or projection-like fastening shaft 96, designed, for example, with a round, in particular circular cross-sectional geometry, of replaceable tool 52, designed in the depicted embodiment as a chisel, extends through fastening opening 92 and is located with a tool engaging end 98 in interchangeable holder interior space 94. Fastening shaft 96 may be held in fastening opening 92 accommodating the same by clamping or latching action, so that a detaching of replaceable tool 52 from interchangeable holder 50 supporting the same is prevented in the operational mode. This clamping or latching action may be generated, for example, in that an annular spring-like latching element is provided in an inner circumferential groove 104 open to fastening opening 92 and may latch into a corresponding outer circumferential groove on fastening shaft 96.

An alternative type of holding of replaceable tool 52 on interchangeable holder 50 is depicted in FIG. 6. Openings 106, 108, via which interchangeable holder interior space 94 is laterally open, are formed in interchangeable holder 50 between both foot regions 86, 88. Holding elements 110, 112 may be laterally shoved into these lateral openings 106, 108 so that they, using holding plates 114, 116 respectively supported thereon and constructed, for example, from metal material, engage into a circumferential groove 118 on fastening shaft 96. Both holding elements 110, 112 may be fixedly connected to one another in this state, for example, by screwing, so that they are secured from moving out of openings 106, 108.

Tool through opening 84, designed in association with interchangeable holder 50 in segment shell 42, is preferably arranged in such a way that it is located coaxial to fastening opening 92 or to an opening longitudinal axis L of fastening opening 92. This means that, in the case of a replaceable tool 52 supported in interchangeable holder 50, fastening shaft 96 is likewise positioned with its tool engaging end 98 substantially coaxial to tool through opening 84 and, for example, is directly opposite the same. At corresponding dimensioning, fastening shaft 96 might extend with its tool engaging end 98 up into tool through opening 84. Due to fastening shaft 96 ending close to or in tool through opening 84 and having approximately the same cross-sectional dimension as this, tool through opening 84 is substantially covered or closed in the case of a replaceable tool 52 supported on interchangeable holder 50, so that contaminants or soil material or the like, entering laterally into interchangeable holder interior space 94, may not arrive into tool through opening 84. Since, as is subsequently described, a lateral engagement into interchangeable holder interior space 94 is not necessary for detaching replaceable tool 52, interchangeable holder 50 might be closed across its entire periphery, in particular in the case when replaceable tool 52 is held by latching in fastening opening 92 of interchangeable holder 50, so that it is basically impossible for contaminants to penetrate into interchangeable holder interior space 94, which may be provided, for example, by fastening opening 92 extending radially inward or by a volume area connecting thereto.

To detach replaceable tool 52 from interchangeable holder 50, for example, after both holding elements 110, 112 are removed from interchangeable holder 50, an impacted tool 100, formed, for example, like a pin, is guided through tool through opening 84 to tool engaging end 98 of fastening shaft 96. Subsequently, impacted tool 100 may be hit by means of impacting tool 102, designed, for example, as a hammer, and thus fastening shaft 96 may be detached from the interchangeable holder, wherein a friction clamping action, generated due to the slightly conical shape of fastening shaft 96 and fastening opening 92 accommodating the same, is overcome and fastening shaft 96 is beaten or shoved out of fastening opening 92 accommodating the same until replaceable tool 52 is completely detached from interchangeable holder 50. Subsequently, a new or different replaceable tool 52 may be shoved or pressed into fastening opening 92 of interchangeable holder 50 from the outside until said tool with its fastening shaft 96 is completely accommodated in fastening opening 92 and, for example, is supported by a tool head on body portion 90 of interchangeable holder 50. When using a latching connection, the latched state is automatically generated by pushing fastening shaft 96 in. When using holding elements 110, 112, depicted in FIG. 6, these may be arranged in openings 106, 108 of interchangeable holder 50 to surround fastening shaft 96 after the insertion of fastening shaft 96 into fastening opening 92.

Since, according to the principles of the present invention, the roller tools, constructed from an interchangeable holder and a replaceable tool, are provided on a sheath mounted detachably on a roller body and surrounding the same, the possibility exists, in the type depicted in FIG. 5, to act on the replaceable tools from the inner side of the respective sheath segments and to thus detach the same from the respective interchangeable holder. This is particularly advantageous as roller tools, arranged in particular in the longitudinal center area of a respective soil working roller, are basically not accessible from the inner side of a roller shell.

The principles of the present invention may be used for soil working rollers which, as in the previously-described embodiment, comprise a roller body which does not itself provide a working outer side, but instead functions solely as a support for a working sheath provided by the sheath, which is designed, adapted to the respective working processes to be carried out, with a suitable configuration on its working outer side. The roller shell of this type of roller body thus merely forms a support sheath, which is provided and designed to support the structure providing the working outer side, namely the sheath acting as the working sheath.

Alternatively, the configuration according to the invention of a sheath for a soil working roller may also be used if this sheath is mounted on the outer periphery of a soil working roller or of a roller body which may itself also provide a working outer side. For example, a roller body of this type or its roller shell may be provided with a substantially smooth, unstructured outer peripheral contour and thus be used, for example, for compacting asphalt material or the like. If such a soil working roller is then to be used for another operation, for example, for crushing a solid substrate, this may be surrounded with a sheath which comprises the previously described structure with multiple sheath segments and roller tools supported on the segment shells of the same. For this type of embodiment, the individual sheath segments may, for example, be fixedly connected, for example, screwed, following one another in the circumferential direction, in order to achieve an annular structure surrounding the roller shell of a soil working roller.

Reference is further made to the fact that the configuration according to the invention of a sheath for a soil working roller may naturally also be used in connection with other replaceable tools. For example, instead of the pointed chisel depicted in the present application, chisels designed to cut or padfoot tools might be used as replaceable tools in connection with interchangeable holders provided on the outer periphery of the sheath.

The invention claimed is:

1. Sheath for a soil working roller of a soil processing machine, wherein said sheath is rotatable about a roller axis of rotation and comprises a plurality of sheath segments, mounted or mountable to surround a roller body of the soil working roller and following one another in the circumferential direction, wherein a plurality of roller tools is arranged on an outer side of the sheath segments positioned to be facing away from the roller body, wherein at least one part of the roller tools comprise an interchangeable holder mounted on a respective sheath segment and a replaceable tool detachably mounted or mountable on the interchangeable holder of the same, wherein a fastening opening is formed in the interchangeable holder for accommodating a fastening shaft of a replaceable tool mounted or to be mounted on the interchangeable holder, wherein an impacted tool through opening is provided in association with the at least one interchangeable holder in the sheath segment supporting the same for engaging the fastening shaft of the replaceable tool mounted on the interchangeable holder with an impacted tool.

2. Sheath according to claim 1, wherein the impacted tool through opening, provided in association with the at least one interchangeable holder, is arranged substantially coaxial with the fastening opening formed in the same.

3. Sheath according to claim 1, wherein an interchangeable holder interior space is formed in the at least one interchangeable holder, wherein the fastening opening provided in this interchangeable holder is open to the interchangeable holder interior space and that the impacted tool through opening provided in association with this interchangeable holder is open to the interchangeable holder interior space.

4. Sheath according to claim 3, wherein, in the case of a replaceable tool mounted on the at least one interchangeable holder, the fastening shaft of this replaceable tool extends into the interchangeable holder interior space and is positioned with a tool engaging end opposite the impacted tool through opening or engaging into the impacted tool through opening.

5. Sheath according to claim 3, wherein, in the case of a replaceable tool mounted on the at least one interchangeable holder, the interchangeable holder interior space is substantially open only via the impacted tool through opening open to the same.

6. Sheath according to claim 1, wherein, in the case of a replaceable tool mounted on the at least one interchangeable holder, the impacted tool through opening is substantially closed by the fastening shaft of this replaceable tool.

7. Method for changing a replaceable tool, mounted on the at least one interchangeable holder on a sheath, wherein said sheath is rotatable about a roller axis of rotation and comprises a plurality of sheath segments, mounted or mountable to surround a roller body of a soil working roller and following one another in the circumferential direction, wherein a plurality of roller tools is arranged on an outer side of the sheath segments positioned to be facing away from the roller body, wherein at least one part of the roller tools comprise an interchangeable holder mounted on a respective sheath segment and a replaceable tool detachably mounted or mountable on the interchangeable holder of the same, wherein a fastening opening is formed in the interchangeable holder for accommodating a fastening shaft of a replaceable tool mounted or to be mounted on the interchangeable holder, wherein an impacted tool through opening is provided in association with the at least one interchangeable holder in the sheath segment supporting the same, in which method, in the case of a sheath segment at least partially detached from the roller body, the fastening shaft, accommodated in the fastening opening of the at least one interchangeable holder, is impacted through the impacted tool through opening by means of an impacted tool to move the fastening shaft out of the fastening opening of the at least one interchangeable holder.

8. Method according to claim 7, wherein the fastening shaft is moved out of the fastening opening by hitting and/or pressing impact.

9. Method according to claim 7, wherein the fastening shaft is impacted by hitting impact of the impacted tool by means of an impacting tool.

10. Soil working roller for a soil processing machine comprising a roller body and a sheath surrounding the roller body, wherein said sheath is rotatable about a roller axis of rotation and comprises a plurality of sheath segments, mounted or mountable to surround a roller body of a soil working roller and following one another in the circumferential direction, wherein a plurality of roller tools is arranged on an outer side of the sheath segments positioned to be facing away from the roller body, wherein at least one part of the roller tools comprise an interchangeable holder mounted on a respective sheath segment and a replaceable tool detachably mounted or mountable on the interchangeable holder of the same, wherein a fastening opening is formed in the interchangeable holder for accommodating a fastening shaft of a replaceable tool mounted or to be mounted on the interchangeable holder, wherein an impacted tool through opening is provided in association with the at least one interchangeable holder in the sheath segment supporting the same.

11. Soil processing machine comprising at least one soil working roller according to claim 10.

12. Sheath for a soil working roller of a soil processing machine, wherein said sheath is rotatable about a roller axis of rotation and comprises a plurality of sheath segments, mounted or mountable to surround a roller body of the soil working roller and following one another in the circumferential direction, wherein a plurality of roller tools is arranged on an outer side of the sheath segments positioned to be facing away from the roller body, wherein at least one part of the roller tools comprise an interchangeable holder mounted on a respective sheath segment and a replaceable tool detachably mounted or mountable on the interchangeable holder of the same, wherein a fastening opening is formed in the interchangeable holder for accommodating a fastening shaft of a replaceable tool mounted or to be mounted on the interchangeable holder, wherein an impacted tool through opening is provided in association with the at least one interchangeable holder in the sheath segment supporting the same for engaging the fastening shaft of the replaceable tool mounted on the interchangeable holder with an impacted tool, wherein, in the case of a replaceable tool mounted on the at least one interchangeable holder, the impacted tool through opening is substantially closed by the fastening shaft of this replaceable tool.

* * * * *